United States Patent [19]

Mizumoto et al.

[11] Patent Number: 5,289,450
[45] Date of Patent: Feb. 22, 1994

[54] METHOD OF AND APPARATUS FOR PLAYING BACK RECORDABLE OPTICAL DISC

[75] Inventors: Katsuji Mizumoto; Mutsumi Kono, both of Tokorozawa, Japan

[73] Assignee: Pioneer Electronic Corporation, Tokyo, Japan

[21] Appl. No.: 922,143

[22] Filed: Jul. 30, 1992

[30] Foreign Application Priority Data

Jan. 8, 1991 [JP] Japan .................. 3-193217

[51] Int. Cl.$^5$ .............................. G11B 7/00
[52] U.S. Cl. ...................... 369/54; 369/58; 369/50; 369/32
[58] Field of Search ........ 369/54, 58, 50, 47, 369/48, 53, 124, 32; 360/75

[56] References Cited

U.S. PATENT DOCUMENTS 5,051,849 9/1991 Fukushima et al. .......... 360/75
5,065,388 11/1991 Roth et al. ................ 369/47

FOREIGN PATENT DOCUMENTS 0390268 10/1990 European Pat. Off. .
0426872 5/1991 European Pat. Off. .

OTHER PUBLICATIONS

Patent Abstracts of Japan vol. 15, No. 292 (P-1230) 24 Jul. 1991 & JP-A-03 100 983 (Yamaha Corp.) 25 Apr. 1991.

European Search Report Application No. EP 92 30 7028 dated Mar. 31, 1993.

*Primary Examiner*—Aristotelis Psitos
*Assistant Examiner*—Muhammad N. Edun
*Attorney, Agent, or Firm*—Kane, Dalsimer, Sullivan, Kurucz, Levy, Eisele and Richard

[57] ABSTRACT

Recorded information is reproduced from a recordable optical disc with a light beam applied from an optical pickup to the recordable optical disc. The recordable optical disc has a program area for recording main information, a PMA area for recording recording history information relative to main information which is in the process of being recorded in the program area, and a lead-in area for recording, as index information, recording history information relative to main information which has fully been recorded in the program area. While the recordable optical disc is at rest, it is determined whether index information is recorded in the lead-in area, and if index information is not recorded in the lead-in area, the optical pickup is moved to a region of the PMA area where the recording history information is recorded, while the recordable optical disc is at rest After the optical pickup has reached the region, the optical pickup reads the recording history information while the recordable optical disc is being rotated. After the recording history information has been read from the region, the optical pickup is moved to the program area while the recording optical disc is being rotated at a constant speed.

8 Claims, 8 Drawing Sheets

METHOD OF AND APPARATUS FOR PLAYING BACK RECORDABLE OPTICAL DISC

BACKGROUND OF THE INVENTION

1. Field of the Invention

The present invention relates to a method of and an apparatus for playing back a recordable optical disc, and more particularly to a method of and an apparatus for reproducing recorded information from a recordable optical disc while other information is being recorded thereon.

2. Description of the Prior Art

Figure 5:
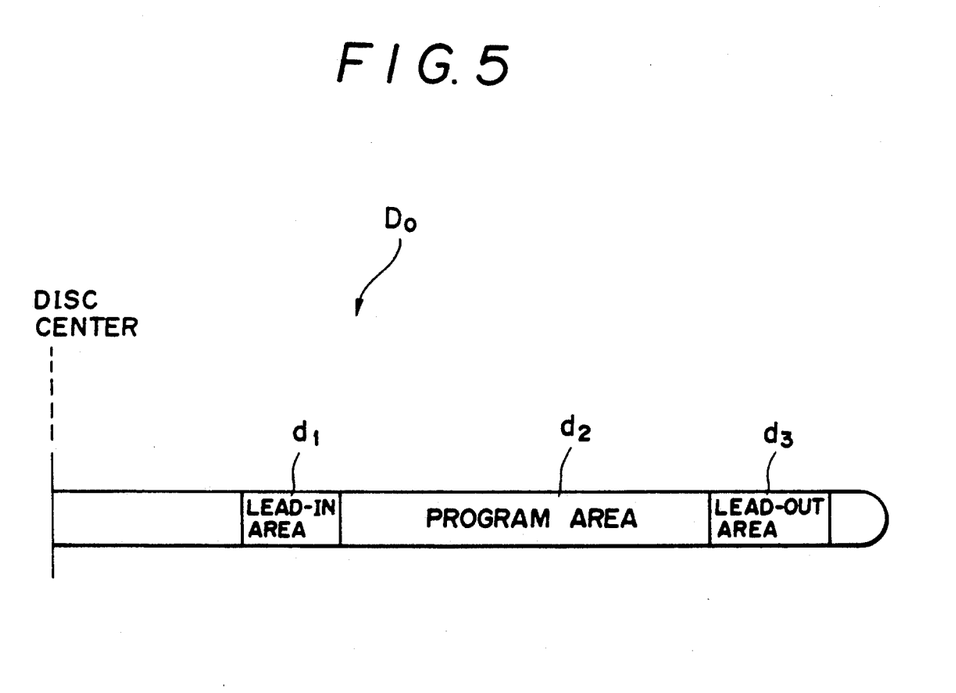
FIG. 5 is a diagram of a recording format of a compact disc.

Heretofore, there are known compact discs (CD) having diameters of 12 cm and 8 cm. As shown in FIG. 5 of the accompanying drawings, a compact disc $D_0$ has a lead-in area $d_1$, a program area $d_2$, and a lead-out area $d_3$ that are arranged successively from an innermost circular boundary on the disc. The compact disc stores a digital signal in the form of an EFM (Eight to Fourteen Modulation) channel code. The recorded digital signal includes a main code representing main information such as music information and a subcode such as a time code (Q data) representing time information. The EFM signal contains a clock signal. The clock signal is compared with a reference synchronizing signal, and any error is fed back through an error amplifier and a spindle motor driver amplifier to a spindle motor for controlling the rotational speed of the spindle motor. Such a motor control process is referred to as a spindle-motor servo control process.

Figure 6:
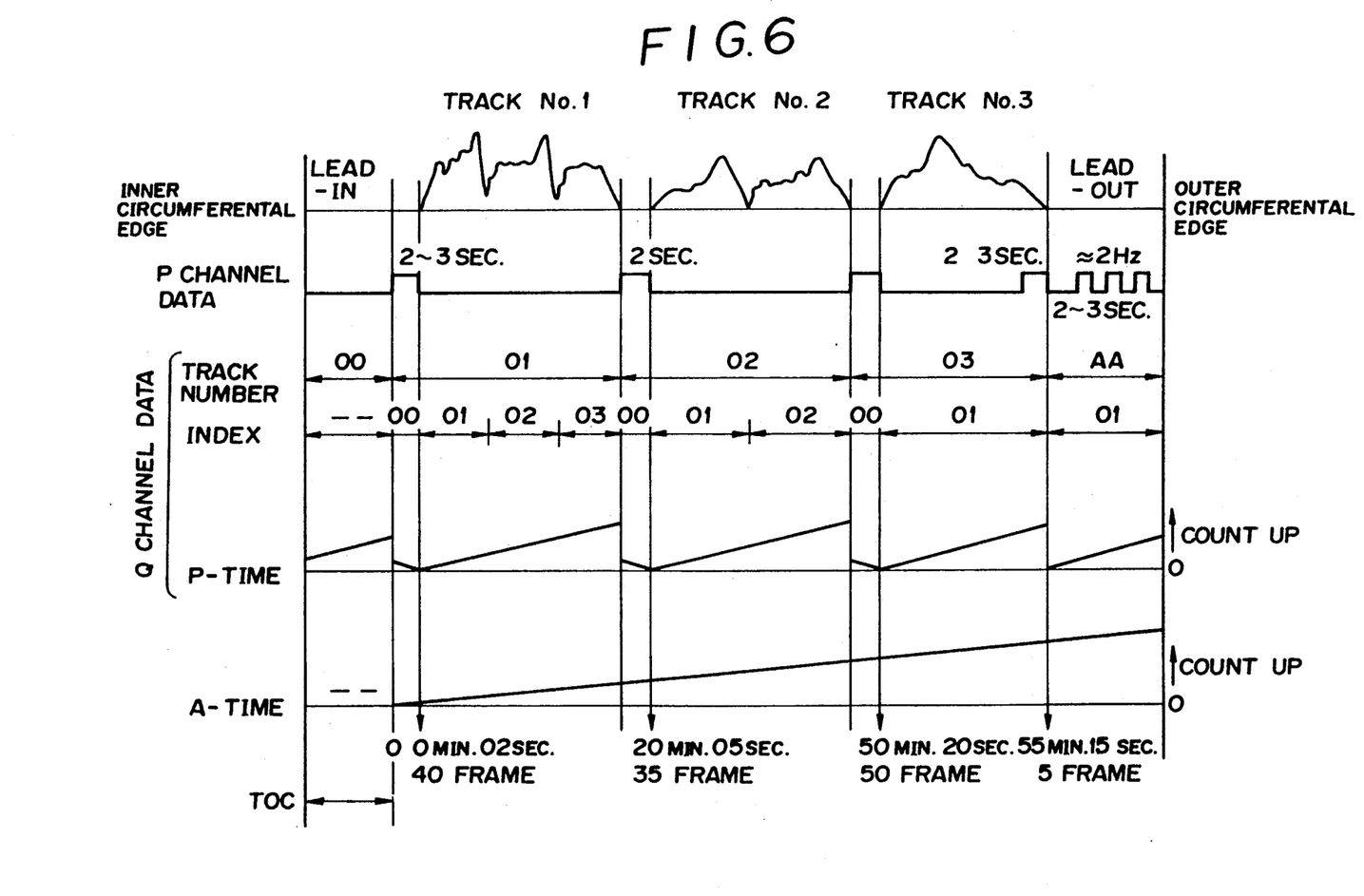
FIG. 6 is a diagram of a recording format in a program area of the compact disc.

The lead-in area $d_1$ stores index information called TOC (Table of Contents) information. The TOC information contains a subcode indicating the total number of music pieces recorded in the program area, the total playback time of recorded music pieces, and other information. As shown in FIG. 6 of the accompanying drawings, the program area contains a main code representative of music information, Q data of the subcode, track numbers (TNO) indicating the numbers of music pieces, relative playback times (P-TIME) from the start of the tracks, an absolute total playback time (A-TIME) measured from the track number 1, and other information. The lead-out area contains a lead-out code representing the lead-out area.

Figure 7:
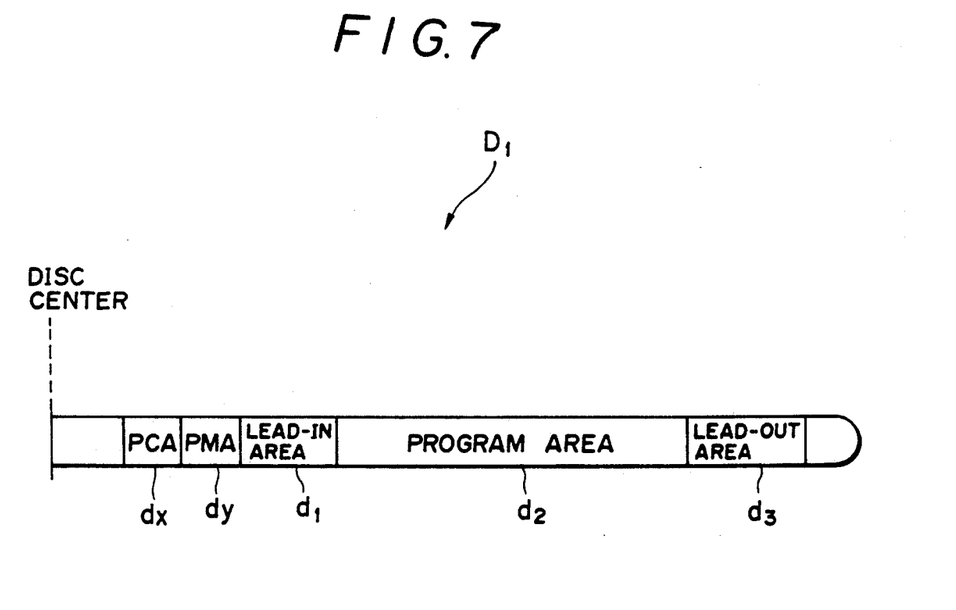
FIG. 7 is a diagram of recording areas on a recordable compact disc.

The CDs with such a recording format are a medium used for playback only. There has recently been developed a recordable compact disc (R-CD) $D_1$ which has substantially the same format as the conventional CD $D_0$ and which allows additional information to be recorded subsequently. The recording format of the R-CD $D_1$ is referred to as "Orange Book". While the recording format of the R-CD $D_1$ is similar to that of the ordinary CD $D_0$, it additionally has a PCA $d_x$ (Power Calibration Area) and a PMA $d_y$ (Program Memory Area) that are positioned radially inwardly of the lead-in area $d_1$, as shown in FIG. 7 of the accompanying drawings. The PCA $d_x$ and the PMA $d_y$ will be described in detail later on.

Tracks on the R-CD $D_1$ are associated with guide grooves that are wobbled or made tortuous by the frequency of a carrier of 22.05 KHz which is frequency-modulated by data indicating absolute time information (ATIP: Absolute Time In Pregroove). A laser beam for recording desired information on the R-CD $D_1$ is controlled to follow the guide grooves under tracking control, and the rotational speed of the spindle motor which rotates the R-CD $D_1$ is controlled so that the wobbling guide groove pattern has a central frequency of 22.05 KHz. In this manner, tracking servo and spindle-motor servo processes can be effected on unrecorded R-CDs as well as recorded R-CDs.

The ATIP information will be described below. The ATIP information contains a plurality of frames each composed of 42 bits. The 42 bits of each frame include 4 bits indicative of a sync pattern (SYNC), 8 bits indicative of a minute (MIN), 8 bits indicative of a second (SEC), 8 bits indicative of a frame (FRAME), and 14 bits indicative of an error correcting code (ECC). The absolute time information represented by the ATIP information equals 1 second in 75 frames as is the case with the Q data of the subcode.

In addition to the ordinary absolution time information, the ATIP information includes special information encoded by the combination of the most significant bits (MSB) of the 8-bit data which indicate MIN, SEC, and FRAME, i.e., the combination of the 5th, 13th, and 21th bits as counted from the beginning of the frame. If the combination of the 5th, 13th, and 21th bits is "101", then the information represented by the 6th, 7th, and 8th bits indicates a recommended recording power, i.e., a recording laser beam intensity, for use with the disc. There are eight recommended recording powers indicated by eight combinations of the 6th, 7th, and 8th bits, ranging from "000" to "111". The recommended recording powers are determined under the conditions that the recording laser beam has a wavelength $\lambda$ of 780 nm and is generated at a temperature T of 25° C. Since the wavelength $\lambda$ is temperature-dependent and different objective lenses have different aperture ratios NA, an optimum recording power may not necessarily be the same as any of the recommended recording powers.

The PCA $d_x$ will now be described below. The PCA $d_x$ is an area where test recording is carried out prior to an information recording process, so that the power of the recording laser beam will be optimized for recording desired information in the information recording process. The PCA $d_x$ is composed of a count area and a test area. The count area has a plurality of subareas corresponding respectively to a plurality of subareas of the test area, and each containing a suitable EFM signal recorded therein. Test recording for measuring an optimum recording laser beam power is carried out in the subareas of the test area. This is because the recommended recording powers indicated by the ATIP information may not necessarily be the same as an optimum recording power. One of the subareas of the test area is consumed by a single test recording cycle.

Any subarea of the test area which has once been used by test recording is not available for a next test recording cycle. It is therefore necessary to search for an unused subarea positioned radially inwardly of the used subarea for use in the next test recording cycle. The count area is provided to facilitate the searching process. More specifically, if suitable EFM signals have been recorded in certain subareas of the count area and no EFM signal has been recorded in a subarea next to those subareas, then unrecorded subarea indicates that the corresponding subarea of the test area is available for test recording. Consequently, that corresponding subarea of the test area may be searched for and test recording carried out therein for measuring an optimum recording laser beam power. After an optimum recording laser beam power has been measured in the subarea of the test area, the corresponding subarea of the count area is searched for, and suitable EFM signal is recorded in that subarea, indicating that test recording has already been conducted in the subarea of the count area.

The PMA $d_y$ is an area for storing a recording history of items of information successively recorded in the program area. Specifically, the start addresses and end addresses of track numbers recorded in the program area, for example, are recorded in the PMA $d_y$ in the same format as the TOC information in the lead-in area $d_1$.

Figure 8A:
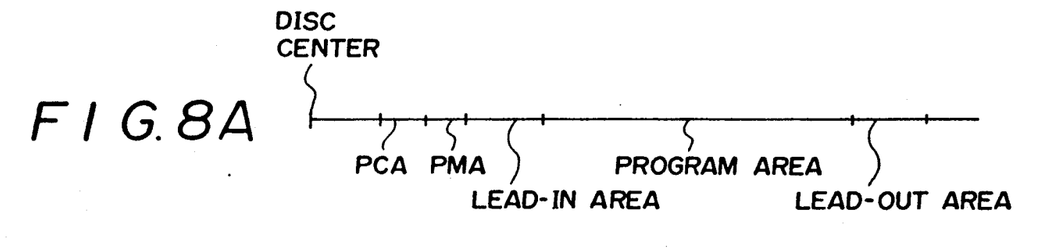
FIGS. 8(A) through 8(C) are diagrams showing the manner in which information is recorded on a recordable compact disc.
Figure 8B:
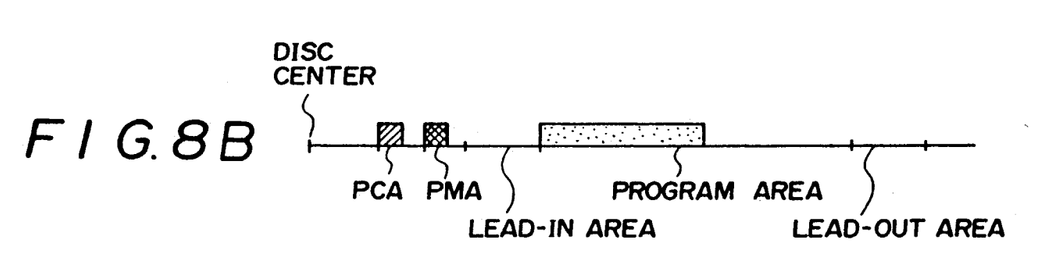
Figure 8C:
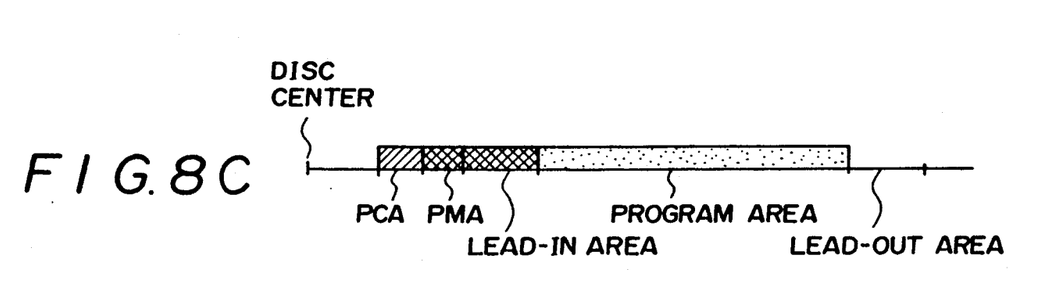

The recording history of successively recorded items of information is stored in the PMA $D_y$ for the following reasons: On a partially recorded disc, information may further be recorded in the remaining blank of the program area. Therefore, the information in the PMA (hereinafter referred to as "temporary TOC information") cannot be recorded in the lead-in area $d_1$ until the completion of recording of all the desired information is finally indicated. Consequently, information about the tracks that have already been recorded is temporarily stored in the PMA $d_y$. When the user or controller of the disc indicates that no more information will be recorded, the TOC information and a lead-out signal are recorded for the first time. At the time the recording is completed, the TOC information in the PMA is transferred to the lead-in area $d_1$ a plurality of times for reliability. The finalized disc (R-CD), on which the recording of all the necessary information is completed, is now based on the CD format, and can be played back by an ordinary playback-only disc player which does not have an ATIP decoder for decoding the ATIP information. FIGS. 8(A), 8(B), and 8(C) show the manner in which information is recorded on an R-CD. Specifically, FIG. 8(A) show an unrecorded R-CD (virgin disc), FIG. 8(B) a partially recorded R-CD, and 8(C) a finalized R-CD.

As described above, no information is recorded in the lead-in area of a partially recorded R-CD. Since no EFM signal is obtained from lead-in area when the R-CD is played back by the ordinary playback-only disc player while the optical pickup of the disc player is positioned over the lead-in area, the spindle-motor servo control process cannot be locked over the lead-in area, and the spindle motor tends to rotate out of control, e.g., to rotate at unduly high speed or in the opposite direction. It is impossible to perform the spindle-motor servo control process using the wobbling frequency of the guide groove on the R-CD because the ordinary playback-only disc player has no means for detecting the wobbling frequency.

SUMMARY OF THE INVENTION

It is an object of the present invention to provide a method of and an apparatus for playing back a partially recorded R-CD while relying upon most of the functions of components of an existing playback-only disc player.

According to the present invention, there is provided a method of reproducing recorded information from a recordable optical disc with a light beam applied from pickup means to the recordable optical disc, the recordable optical disc having a program area for recording main information, a recording history area for recording recording history information relative to main information which is in the process of being recorded in the program area, and an index area for recording, as index information, recording history information relative to main information which has fully been recorded in the program area, the method comprising steps of: (a) determining whether index information is recorded in the index area while the recordable optical disc is at rest (b) if index information is not recorded in the index area, moving the pickup means to a region of the recording history area where the recording history information is recorded while the recordable optical disc is at rest; (c) after the pickup means has reached the region, reading the recording history information from the region with the pickup means while the recordable optical disc is rotating; and (d) after the recording history information has been read from the region, moving the pickup means to the program area while the recording optical disc is rotating at a constant speed.

The step (b) includes the steps of moving the pickup means out of the recording history area, and thereafter, moving the pickup means back to the start of the recording history area.

According to the present invention, there is also provided an apparatus for reproducing recorded information from a recordable optical disc having a program area for recording main information, a recording history area for recording recording history information relative to main information which is in the process of being recorded in the program area, and an index area for recording, as index information, recording history information relative to main information which has fully been recorded in the program area, the apparatus comprising rotating means for rotating the recordable optical disc, pickup means for applying a light beam to the recordable optical disc to read recorded information therefrom, moving means for moving the pickup means radially over the recordable optical disc, and control means for controlling the rotating means, the pickup means, and the moving means to determine whether index information is recorded in the index area while the recordable optical disc is at rest, and if index information is not recorded in the index area, to move the pickup means to a region of the recording history area where the recording history information is recorded while the recordable optical disc is at rest, and after the pickup means has reached the region, to read the recording history information from the region with the pickup means while the recordable optical disc is rotating, and after the recording history information has been read from the region, to move the pickup means to the program area while the recording optical disc is rotating at a constant speed.

If index information is not recorded in the index area, the control means moves the pickup means out of the recording history area, and thereafter, moves the pickup means back to the start of the recording history area.

With the above arrangement of the present invention, it is first determined whether index information, e.g., TOC information, is recorded in the index area, e.g., a lead-in area of the recordable optical disc, while the recordable optical disc is at rest. If no index information is recorded in the index area, then the pickup means is moved to search the recording history area, e.g., a PMA of the recordable optical disc, for recording history information, e.g., PMR information or temporary TOC information, while the recordable optical disc is at rest, and the recording history information is read from the recording history area. Thereafter, desired main information is read from the program area based on the recording history information while the recordable optical disc is rotating.

Until the pickup means reaches the region of the recording history area where the recording history information is recorded, the pickup means is moved without the recordable optical disc rotating. Therefore, the rotating means, e.g., a spindle motor, is prevented from operating out of control. As the rotating means is not energized, a non-disc or a totally unrecorded recordable optical disc can immediately be ejected. After the recording history information has been read, the pickup means is moved to the program area while the recordable optical disc is rotating at a constant speed. Therefore, the rotating means is also prevented from rotating out of control at this time. After the pickup means has reached a desired region of the program area, it can immediately start reproducing desired information therefrom because the rotating means has already been energized.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
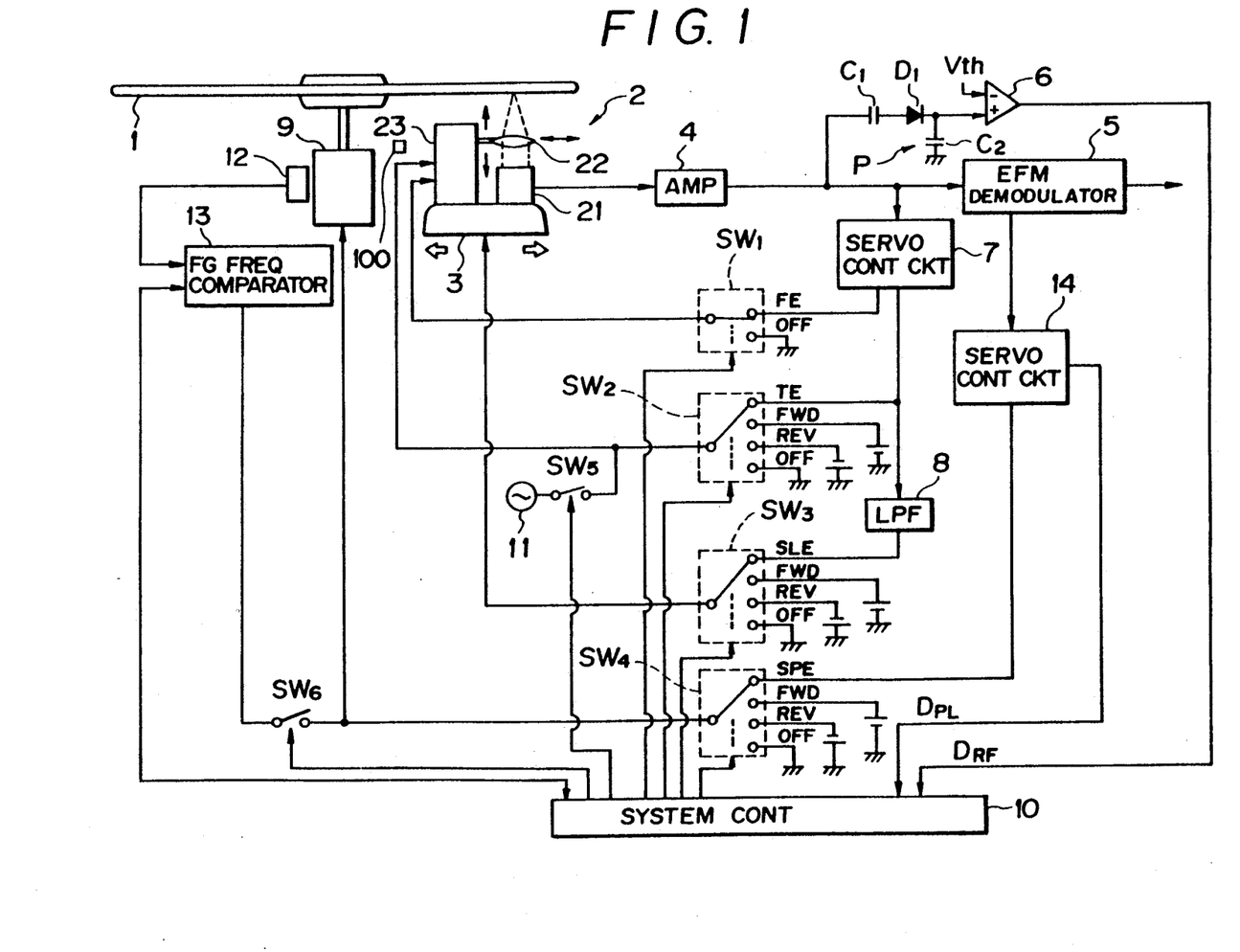
FIG. 1 is a block diagram of an apparatus for playing back a recordable optical disc according to the present invention.

FIG. 1 shows an apparatus for playing back a recordable compact disc (R-CD). The apparatus shown in FIG. 1 is in the form of a disc player. The disc player comprises an optical pickup 2 serving as a pickup means, a sled mechanism 3 serving as a moving means, a playback amplifier 4, a peak holding circuit P, an EFM demodulator 5, servo control circuits 7, 14, a low-pass filter 8, a spindle motor 9 serving as a rotating means, a system controller 10, an oscillator 11, a frequency generator (FG) 12, an FG frequency comparator 13, and switches $SW_1$, $SW_2$, $SW_3$, $SW_4$, $SW_5$, $SW_6$. The system controller 10, the peak holding circuit P, the servo control circuits 4, 7, the low-pass filter 8, the oscillator 11, the frequency generator 12, the FG frequency comparator 13, and the switches $SW_1$, $SW_2$, $SW_3$, $SW_4$, $SW_5$, $S_6$ jointly serve as a control means. The system controller may comprise a microcomputer programmed to perform various playback processes of the disc player shown in FIG. 1.

A process of playing back an ordinary CD with the disc player will be described below.

The optical pickup 2 applies an information reading beam, such as a laser beam, to a disc 1. Information recorded on the disc 1, which is borne by the beam reflected by the disc 1, is applied to and read by a transducer 21 of the optical pickup 2. The optical pickup 2 includes an objective lens 22 for focusing the information reading beam onto the disc 1 The objective lens 22 is movable by an actuator 23 in the direction (focusing direction) along the optical axis thereof and also in the direction (tracking direction) radially across the disc 1. The optical pickup 2 itself is movable in the radial direction of the disc 1 by the sled mechanism 3.

An RF signal read by the transducer 21 of the optical pickup 2, which RF signal is indicative of the information recorded on the disc 1, is supplied through the playback amplifier 4 to the EFM demodulator 5. The EFM demodulator 5 supplies its output signal, or a reproduced EFM signal, to the servo control circuit 14.

The RF signal is also through a coupling capacitor $C_1$ to the peak holding circuit P which is composed of a diode $D_1$ and a capacitor $C_2$. The peak holding circuit P produces a voltage corresponding to the level of the RF signal, and applies the voltage to one input terminal of a comparator 6. The other input terminal of the comparator 6 is supplied with a voltage Vth of a predetermined threshold level. The comparator 6 therefore produces an output signal, or a detected RF signal, $D_{RF}$ of an "H" or "L" level depending on the amplitude of the RF signal.

In response to the RF signal from the transducer 21, the servo control circuit 7 produces a focus error signal FE and a tracking error signal TE. These error signals FE, TE are supplied through the switches $SW_1$, $SW_2$ to the actuator 23. Therefore, the transducer 21, the playback amplifier 4, the servo control circuit 7, the switches $SW_1$, $SW_2$, and the actuator 23 provide focus and tracking servo loops.

The low-pass filter 8 extracts a low-frequency component from the tracking error signal TE, and generates a sled error signal SLE for enabling the sled mechanism 3 to move the optical pickup 2. The sled error signal SLE is supplied through the switch $SW_3$ to the sled mechanism 3. Therefore, the transducer 21, the playback amplifier 4, the servo control circuit 7, the low-pass filter 8, the switch $SW_3$, and the sled mechanism 3 provide a sled servo loop.

The servo control circuit 14 generates a spindle error signal SPE based on the phase difference between a reference clock signal and a reproduced clock signal that is extracted from the reproduced EFM signal from the EFM demodulator 5. The spindle error signal SPE is supplied through the switch $SW_4$ to the spindle motor 9. The reproduced clock signal is generated by a phase-locked loop (PLL), not shown, in the servo control circuit 14. A detected PLL lock signal $D_{PL}$ indicative of the locked state of the PLL is supplied from the servo control circuit 14 to the system controller 10.

The switches $SW_1$, $SW_2$, $SW_3$, $SW_4$ are controlled by the system controller 10 to selectively turn on and off the corresponding servo loops. In addition, the movable contacts of some of these switches are connectable to drive signal sources for energizing the actuators or drive sources of the respective servo loops associated with the switches. More specifically, in the tracking servo loop, the movable contact of the switch $SW_2$ can be supplied with a forward (FWD) voltage or a reverse (REV) voltage to enable the objective lens 22 to jump radially of the disc 1 in one radial direction or the other.

In the sled servo loop, the movable contact of the switch $SW_3$ can be supplied with an FWD voltage or a REV voltage to enable the optical pickup 2 to move at high speed radially of the disc 1 in one radial direction or the other. In the spindle servo loop, the movable contact of the switch $SW_4$ can be supplied with an FWD voltage or a REV voltage to accelerate or decelerate the spindle motor 9. The DC levels of the FWD and REV voltages applied to the switches $SW_2$, $SW_3$, $SW_4$ can be controlled by the system controller 10. For example, the voltage levels of the FWD and REV signals applied to the sled mechanism 3 through the switch $SW_3$ can be varied by the system controller 10 to vary the speed at which the optical pickup 2 moves in the radial direction of the disc 1.

Figure 2:
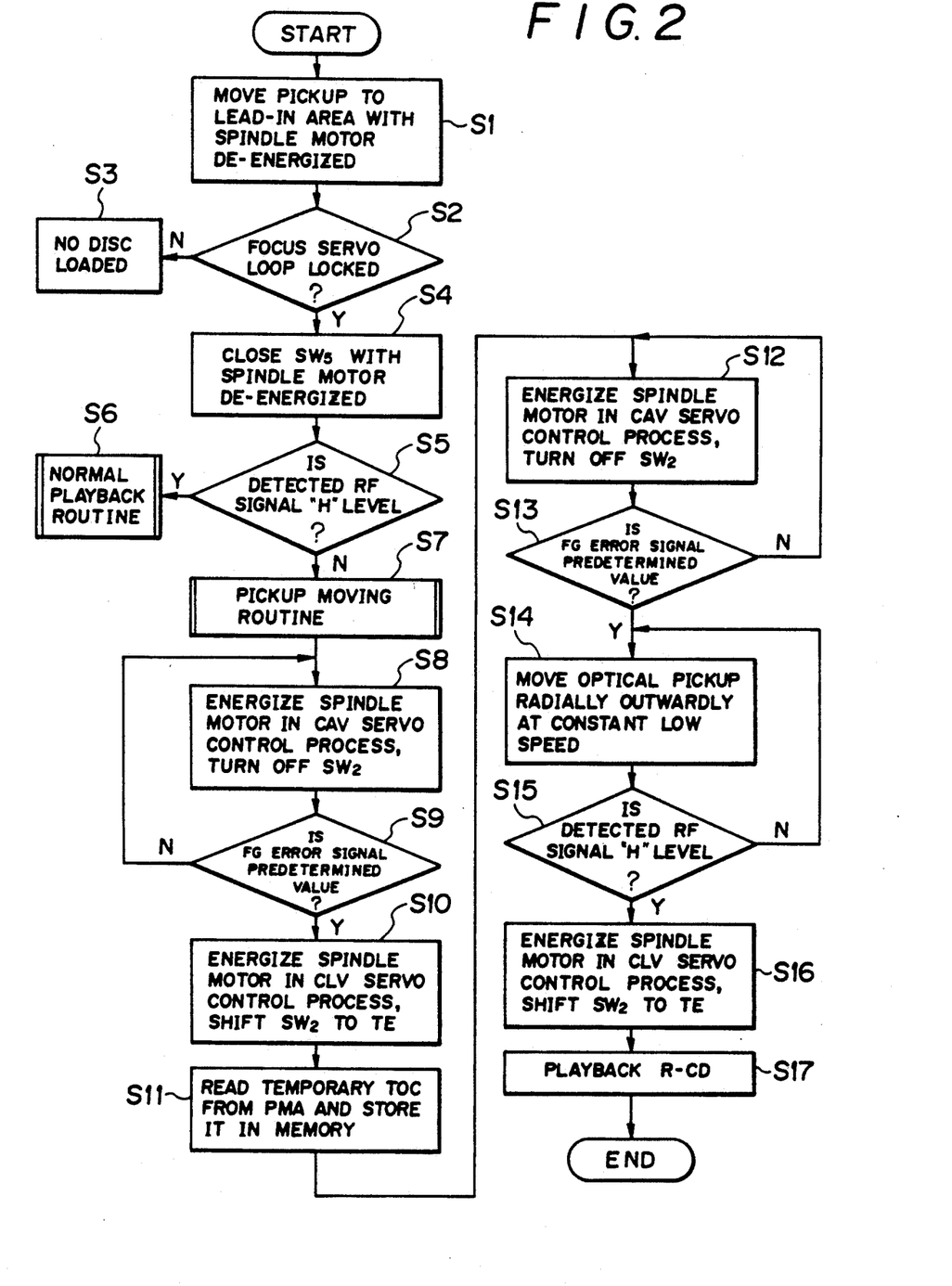
FIG. 2 is a flowchart of an operation sequence of the apparatus shown in FIG. 1.

A process of playing back a partially recorded R-CD will be described below with reference to FIGS. 2 and 3. As shown in FIG. 2, while the spindle motor 9 is being de-energized, the optical pickup 2 is radially moved to a position corresponding to the lead-in area of the disc 1 by the sled mechanism 3 in a step S1. Usually, the lead-in area is positioned in a radial range of from 23 mm to 25 mm from the center of the disc 1. The optical pickup 2 is radially moved by the sled mechanism 3 until it reaches a sensor switch 100 which is positioned at the radially innermost end of the lead-in area of the disc 1.

Then, the focus servo loop is turned on, and a step S2 determines whether the focus servo loop is locked or not. The focus servo loop may be locked in the manner as disclosed in Japanese laid-open patent publication No. 63-13261, for example. If the focus servo loop is not locked within a predetermined period of time or by a predetermined number of retrials, then it is determined that the focus servo loop is unlocked, and that there is no disc in a step S3.

If the focus servo loop is locked in the step S2, then the switch $SW_5$ is closed, i.e., turned on, by the system controller 10 with the spindle motor 9 de-energized in a step S4. When the switch $SW_5$ is turned on, the output signal from the oscillator 11 is supplied to the tracking servo loop. The oscillator 11 produces its output signal at a single frequency. Therefore, when the tracking servo loop is turned off (i.e., the switch $SW_2$ is turned off) and the switch $SW_5$ is turned on, since the output signal from the oscillator 11 is supplied to the tracking servo loop, the actuator 23 moves the objective lens 22 back and forth, or vibrates the objective lens 22, in the radial direction of the disc 1, or the tracking direction, at the frequency of the output signal from the oscillator 11. With the output signal from the oscillator 11 being of a suitable amplitude, the laser beam as the information reading beam moves across a plurality of tracks on the disc 1. Generally, the actuator 23 moves the objective lens 22 over a range of several hundreds $\mu m$ when supplied with the output signal from the oscillator 11. Therefore, if the tracks on the disc 1 are spaced at a track pitch of 1.6 $\mu m$, then the laser beam moves across 100 or more tracks on the disc 1.

When the laser beam moves across plural tracks on the disc 1, the RF signal is read by the optical pickup 2 as follows: When the actuator 23 vibrates the objective lens 22 in the radial direction of the disc 1 over an unrecorded region of the disc 1, the laser beam moves across a plurality of tracks on the disc 1, and the RF signal read by the optical pickup 2 has its intensity varied depending on the position of the guide grooves on the R-CD. The intensity variation is referred to as "radial contrast". The radial contrast is generally very low in level though they depend on the depth of the guide grooves, the wavelength of the laser beam, and the track pitch. Since the output signal from the peak holding circuit P is also very low in level, the comparator 6 produces a detected RF signal of an "L" level.

When the actuator 23 vibrates the objective lens 22 in the radial direction of the disc 1 over a recorded region of the disc 1, the laser beam is diffracted by pits on the tracks that the laser beam has moved across, and hence the intensity of the reflected laser beam varies. In the usual playback process for reproducing recorded information from the disc 1, as described above, the RF signal is produced because the intensity of the reflected laser beam is varied as the laser beam is diffracted by pits on the tracks which are traced in the tangential direction thereof. Even when the laser beam moves across the tracks or in the radial direction of the disc 1, however, the laser beam is also diffracted because it encounters pits in the tracks that the laser beam has crossed in the radial direction, and the reflected laser beam undergoes intensity variations in a different frequency band from that in the usual playback process. The intensity variations of the reflected laser beam result in an RF signal amplitude. Consequently, the output signal from the peak holding circuit P has a relatively high level, and the comparator 6 generates a detected RF signal of an "H" level.

Figure 4:
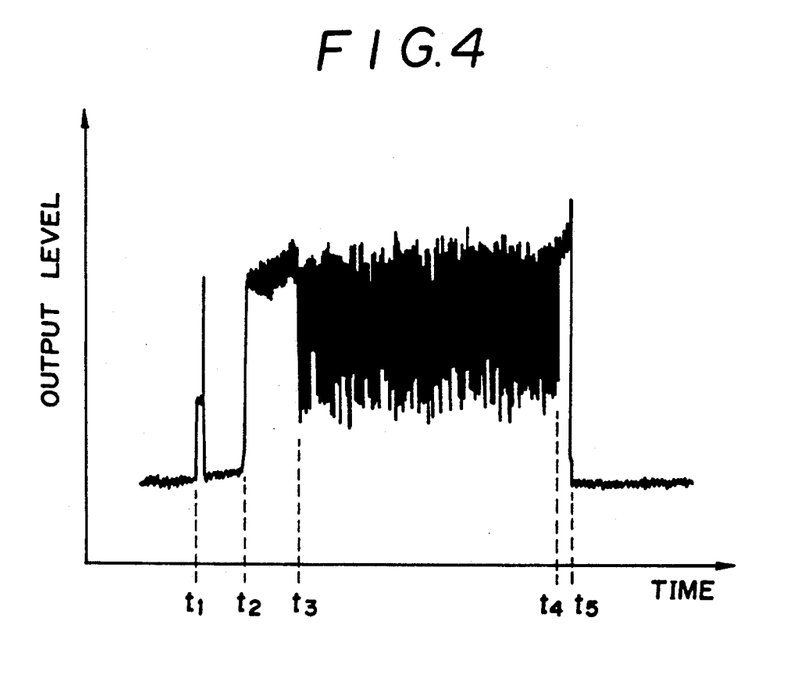
FIG. 4 is a diagram showing the waveform of a detected RF signal.

FIG. 4 shows the waveform of the RF signal reproduced from a partially recorded R-CD by the comparator 6. In FIG. 4, the focus servo loop is locked at a time $t_1$, and from a time $t_2$ on, while the actuator 23 is vibrating the objective lens 22 in the radiation direction of the disc 1, the sled servo loop is activated to move the optical pickup 2 in one radial direction (FWD direction) of the disc 1. The RF signal appearing from the time $t_2$ to a time $t_3$ is generated when the laser beam from the optical pickup 2 scans the lead-in area of the disc 1. As shown in FIG. 4, the RF signal indicates a low radial contrast from the time $t_2$ to the time $t_3$. When the laser beam starts to enter the recorded program area at the time $t_3$, the generated RF signal has a larger amplitude because the laser beam is diffracted by the pits on the tracks in the program area. Then, upon arrival at an unrecorded region at a time $t_4$, the generated RF signal has a smaller amplitude again owing to a low radial contract. The actuator 23 stops vibrating the objective lens 22 at a time $t_5$.

Since a DC component is removed from the RF signal by the coupling capacitor $C_1$, the peak holding circuit P holds a peak voltage value relative to the center of the amplitude of the RF signal. The peak voltage held by the peak holding circuit P is then compared with the threshold level Vth by the comparator 6, which produces a detected RF signal $D_{RF}$. The detected RF signal $D_{RF}$ which is reproduced from the lead-in area of a partially recorded R-CD is of an "L" level as no information has been recorded in the lead-in area. However, the detected RF signal $D_{RF}$ which is reproduced from the lead-in area of an ordinary CD or a finalized R-CD on which the recording of information is completed is of an "H" level as information has been recorded in the lead-in area.

In FIG. 2, a step S5 determines whether the detected RF signal $D_{RF}$ from the comparator 6 is of an "H" or "L" level. If the detected RF signal $D_{RF}$ is of an "H" level, then since the disc 1 is an ordinary CD or a finalized R-CD, the TOC information is read from the lead-in area of the disc 1, and then the information recorded in the program area of the disc 1 is reproduced, i.e., a normal playback routine is executed, in a step S6.

If the detected RF signal $D_{RF}$ is of an "L" level, then control goes to a pickup moving routine in a step S7.

Figure 3:
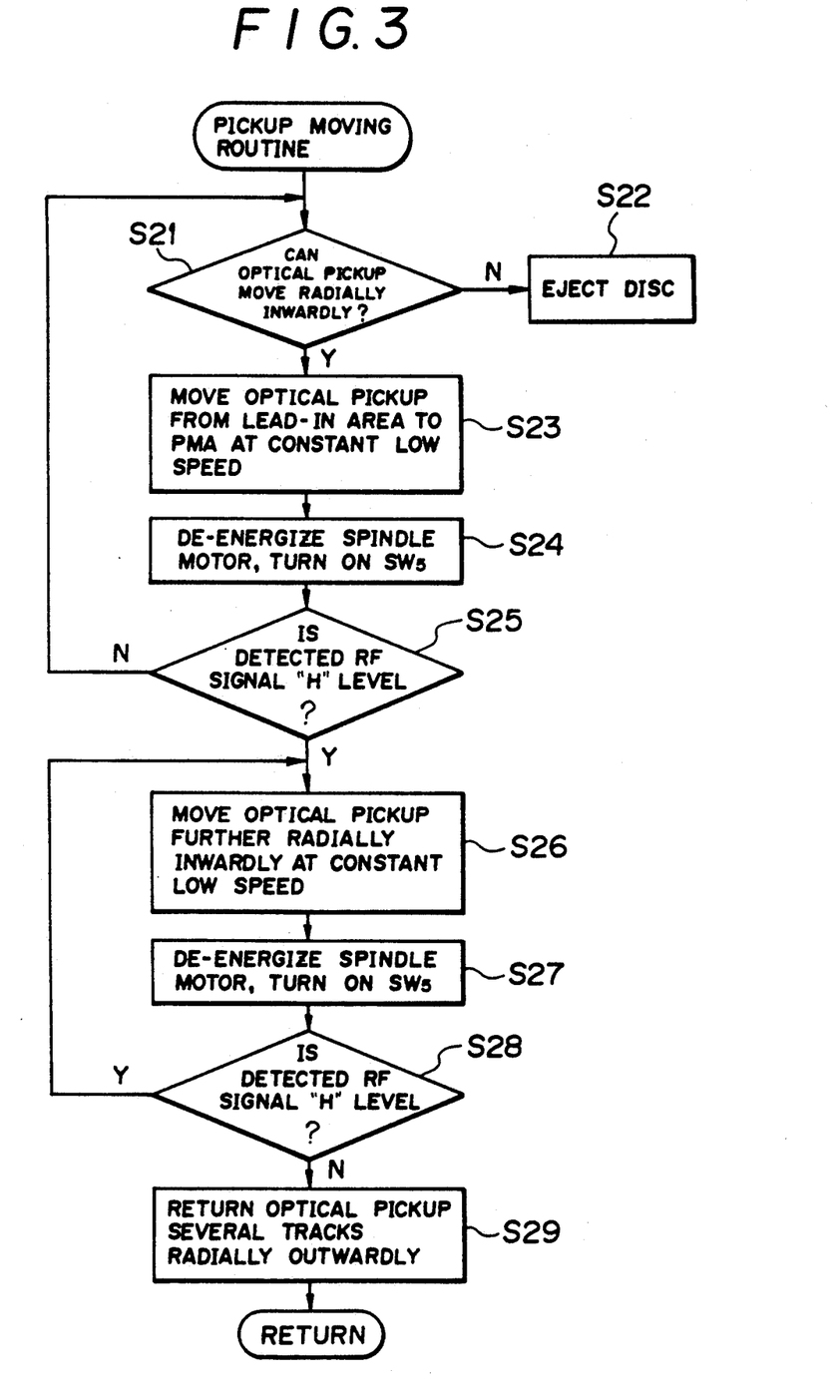
FIG. 3 is a flowchart of a pickup moving routine in the operation sequence shown in FIG. 2.

FIG. 3 shows the pickup moving routine in detail. In the pickup moving routine, a step S21 determines whether the optical pickup 2 can be moved further radially inwardly from the lead-in area, based on the signal from the sensor switch 100. If the optical pickup 2 cannot be moved further inwardly from the lead-in area, then the disc 1 is ejected in a step S22.

If the optical pickup 2 can be moved further inwardly from the lead-in area, then the optical pickup 2 is moved radially inwardly at a constant low speed toward the PMA $d_y$ by the sled mechanism 3 in a step S23. At this time, the spindle motor 9 remains de-energized. While the spindle motor 9 is being de-energized, the switch $SW_5$ is turned on to detect an RF signal in a step S24. A step S25 determines whether a detected RF signal $D_{RF}$ is of an "H" level or not. If the detected RF signal $D_{RF}$ is of an "L" level, then the sled mechanism continuously moves the optical pickup 2 toward the PMA $d_y$ at the constant low speed while monitoring the detected RF signal $D_{RF}$. If the detected RF signal $D_{RF}$ remains in the "L" level when the optical pickup 2 reaches the radially innermost boundary of the disc 1, then the disc is ejected in the step S22 because the disc 1 is completely new (non-recorded).

If the detected RF signal $D_{RF}$ is of an "H" level, then it indicates that the laser beam from the optical pickup 2 has entered the PMA $d_y$ where the recording history is stored. To read the temporary TOC information from the PMA $d_y$, however, it is necessary to read it from the start of the PMA. Therefore, the optical pickup 2 is further moved toward the radially inner end of the PMA $d_y$ at a constant low speed in a step S26. While the spindle motor is being de-energized, the switch $SW_5$ is turned on to detect the RF signal in a step S27. The step S27 is followed by a step S28 which determines whether a detected RF signal $D_{RF}$ is of an "H" level or not. If the detected RF signal $D_{RF}$ is of an "H" level, then it indicates that the laser beam is still in the PMA $d_y$ and the steps S26 through S28 are repeated. If the detected RF signal $D_{RF}$ is of an "L" level, then it indicates the laser beam is out of the PMA $d_y$, i.e., has moved radially inwardly of the PMA. When the detected RF signal $D_{RF}$ is of an "L" level at this time, the laser beam is usually positioned about 10 tracks radially inwardly of the PMA $d_y$. The optical pickup 2 is now returned about 10 tracks radially outwardly back to the PMA in a step S29, whereupon the optical pickup 2 can reliably start to read the temporary TOC information recorded in the PMA. Alternatively, the step S29 may be followed by the same flow as the steps S26 through S28 except that the optical pickup 2 is moved at a lower speed for higher positioning accuracy.

After the pickup moving routine shown in FIG. 3, the spindle motor 9 is energized. Specifically, to prevent the spindle motor 9 from operating out of control, the spindle motor 9 is energized according to a constant angular velocity (CAV) servo control process. In the normal CD playback process for playing back ordinary CDs, the spindle motor 9 is energized according to a constant linear velocity (CLV) servo control process using the EFM signal. However, the CLV servo control process is not relied upon here because it would allow the spindle motor 9 to operate out of control without an EFM signal.

The CAV servo control process is carried out using the frequency generator 12. More specifically, in a step S8, the switch $SW_6$ is closed to turn on an FG servo loop which is composed of the spindle motor 9, the switch $SW_6$, the FG frequency comparator 13, and the frequency generator 12. In the FG servo loop, the spindle motor 9 is controlled based on an FG error signal produced by the FG frequency comparator 13. At this time, the switch $SW_4$ is turned off. The FG frequency comparator 13 compares a frequency signal from the frequency generator 12 positioned near the spindle motor 9 and a reference voltage corresponding to a normal rotational speed of the disc 1 in the radial position where the optical pickup 2 is located, and produces the difference as an FG error signal. The reference voltage is set by the system controller 10. The FG servo loop remains activated until the FG error signal is of a value close to zero in a step S9.

In the FG servo loop, the switch $SW_2$ is turned off, turning off the tracking servo loop. Therefore, the optical pickup 2 does not follow the tracks. The tracking servo loop is turned off because the number of tracks where the temporary TOC information is recorded in the PMA is small, and hence the laser beam may move past the region where the temporary TOC information is recorded if the rotational speed of the spindle motor 9 converges to a reference speed while the tracking servo loop is turned on.

If the FG servo loop is locked in the step S9, then the switch $SW_6$ is turned off and the switch $SW_4$ is turned on to energize the spindle motor 9 in the CLV servo loop in a step S10. At the same time, the switch $SW_2$ is shifted to supply the tracking error signal TE in the tracking servo loop, i.e., to turn on the tracking servo loop. The temporary TOC information is thus read from the PMA, and stored in a memory (not shown) in the system controller 10 in a step S11.

Inasmuch as the temporary TOC information relative to the R-CD has now been obtained, the disc player can reproduce desired information such as music information from the program area based on the temporary TOC information. With the unrecorded lead-in area being present between the PMA and the program area as shown in FIG. 8(B), the spindle motor 9 would tend to operate out of control if the optical pickup 2 were moved according to the CLV servo control process. To alleviate such a drawback, the system controller 10 sets a reference voltage corresponding to the rotational speed of the spindle motor 9 at the time the temporary TOC information has been read in the step S11, and the FG servo loop is turned on to reduce the difference between the reference voltage and the output signal from the frequency generator 12, which are compared by the FG frequency comparator 13, in a step S12. At this time, the switch $SW_2$ is turned off, turning off the tracking servo loop. If the FG servo loop is locked in a step S13, then the spindle motor 9 remains energized to rotate at the speed obtained at this time, moving the optical pickup 2 radially outwardly of the PMA in a step S14. Then, a step S15 determines whether the detected RF signal $D_{RF}$ produced by the comparator 6 is of an "H" level or not. If the detected RF signal $D_{RF}$ is of an "H" level, then it indicates that the laser beam from the optical pickup 2 has entered the program area. Therefore, the spindle motor 9 is energized according to the CLV servo control process, and the switch $SW_2$ is shifted to supply the tracking error signal TE to turn on the tracking servo loop in a step S16. The disc player now reproduces the recorded information from the program area of the disc 1 in a step S17.

As described above, even if the disc 1 has an unrecorded region where the optical pickup 2 cannot be controlled according to the CLV servo control process because there is no EFM signal recorded in that region, the spindle motor 9 is prevented from operating out of control over such an recorded region, and the temporary TOC information can reliably be read from the PMA, thus permitting desired information to be reproduced from the program area based on the temporary TOC information.

In the step S7 for searching for the start of the PMA, the optical pickup 2 may be moved while the spindle motor 9 is being energized according to the CAV servo control process. However, such a control sequence would be disadvantageous in that in the event that the disc 1 is a virgin disc, the spindle motor 9 would have to be de-energized to allow the disc 1 to be ejected in the step S22 (FIG. 3), and hence the extra step of de-energizing the spindle motor 9 would be required.

After the temporary TOC information has been read from the PMA, the spindle motor 9 may be de-energized while the optical pickup 2 is being moved from the PMA over the lead-in area to the program area in the steps S12 through 14 (FIG. 2). However, since the spindle motor 9 has already been energized in the steps S10, S11, it is faster for the playback process to be performed with the spindle motor 9 remaining energized than would be if the spindle motor 9 were de-energized.

The present invention is advantageous in that partially recorded R-CDs can be played back simply by modifying the algorithm of the system controller of an existing playback-only disc player, while relying upon most of the functions of the components of the disc player.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of reproducing recorded information from a recordable optical disc with a light beam applied from pickup means to the recordable optical disc, the recordable optical disc having a program area for recording main information, a recording history area for recording recording history information relative to main information which is in the process of being recorded in the program area, and an index area for recording, as index information, recording history information relative to main information which has fully been recorded in the program area, said method comprising steps of:

(a) determining whether index information is recorded in said index area while the recordable optical disc is at rest;

(b) moving said pickup means to a region of said recording history area, where the recording history information is recorded, while the recordable optical disc is at rest, if index information is not recorded in said index area;

(c) reading said recording history information from said region with said pickup means while the recordable optical disc is being rotated, after said pickup means has reached said region; and (d) moving said pickup means to said program area while the recording optical disc is being rotated at a constant speed after said recording history information has been read from said region.

2. A method according to claim 1, wherein said step (b) includes the steps of:

moving said pickup means inwardly from said recording history area; and thereafter, moving said pickup means back to the start of said recording history area.

3. A method according to claim 2, wherein a CAV servo control is performed without a tracking servo control.

4. A method according to claim 1, wherein in said step (d), a CLV servo control and a tracking servo control is performed.

5. An apparatus for reproducing recorded information from a recordable optical disc having a program area for recording main information, a recording history area for recording recording history information relative to main information which is in the process of being recorded in the program area, and an index area for recording, as index information, recording history information relative to main information which has fully been recorded in the program area, said apparatus comprising:

rotating means for rotating said recordable optical disc;

pickup means for applying a light beam to said recordable optical disc to read recorded information therefrom;

moving means for moving said pickup means radially over said recordable optical disc; and control means for controlling said rotating means, said pickup means, and said moving means to determine whether index information is recorded in said index area while the recordable optical disc is at rest, and if index information is not recorded in said index area, to move said pickup means to a region of said recording history area where the recording history information is recorded while the recordable optical disc is at rest, and after said pickup means has reached said region, to read said recording history information from said region with said pickup means while the recordable optical disc is being rotated, and after said recording history information has been read from said region, to move said pickup means to said program area while the recording optical disc is rotating at a constant speed.

6. An apparatus according to claim 5, wherein said control means comprises means for moving said pickup means inwardly from said recording history area, and thereafter, moving said pickup means back to the start of said recording history area, if index information is not recorded in said index area.

7. An apparatus according to claim 6, wherein said means performs a CAV servo control without a tracking servo control.

8. An apparatus according to claim 5, said control means performs a CLV servo control and a tracking servo control when the program area is read.

* * * * *

UNITED STATES PATENT AND TRADEMARK OFFICE
CERTIFICATE OF CORRECTION

PATENT NO. : 5,289,450
DATED : February 22, 1994
INVENTOR(S) : Katsuji Mizumoto and Mutsumi Kono It is certified that error appears in the above-indentified patent and that said Letters Patent is hereby corrected as shown below:

On the title page, Item [30], correct the priority data to read as follows:

August 1, 1991 [JP] Japan............3-193217

Signed and Sealed this

Fourth Day of April, 1995

Attest:

BRUCE LEHMAN

*Attesting Officer*     *Commissioner of Patents and Trademarks*